3,332,163
FISHING TACKLE
Harold P. Stewart, 25 Bartlett St., and Harold A. Stewart, 5 Hunt St., both of Beverly, Mass. 01915
Filed Nov. 6, 1964, Ser. No. 409,367
6 Claims. (Cl. 43—44.86)

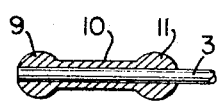
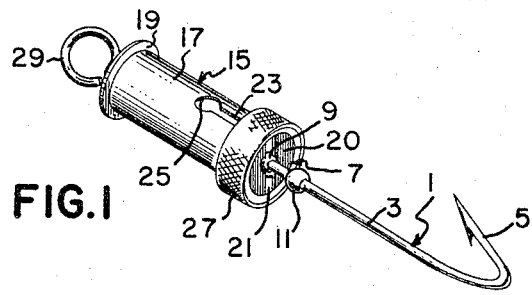
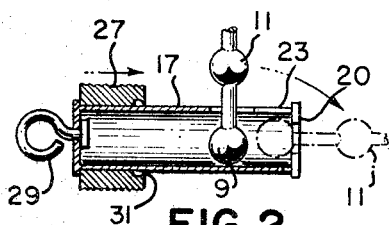
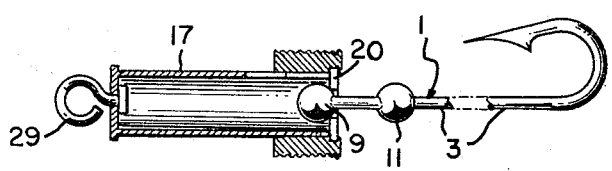
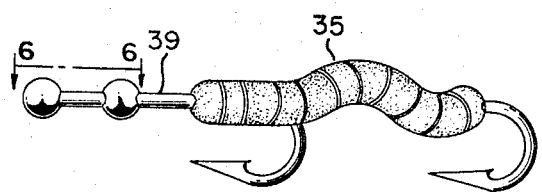
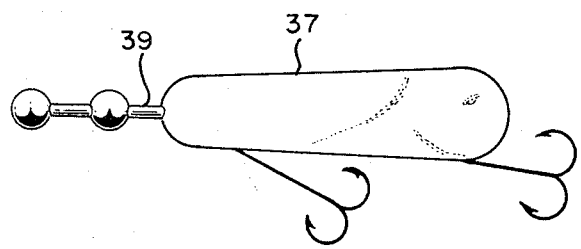

This invention relates to fishing tackle for catching and securing fish. More particularly, the invention relates to fish hooks which are easily removed from the line and substituted with another.

Fish hooks and lines have been designed and utilized since ancient times for catching fish. In general, the operative portions have included a shank with a hook and barb disposed at one end and a means for attaching the hook to a line, such as an eyelet. Similarly, lures have the same basic construction, that is a shank, a barbed hook and an eyelet. The remainder of the lure can be shaped as desired by the designer.

Usually, the hooks are attached to the line with a spring-type catch tied to the end. Opening the catch to remove the hook involves squeezing a tiny, but usually strong, spring and then shifting it laterally. Although this operation is easy when the fingers are dry, when wet and slimy from fishing, it is almost impossible.

Of course, fishermen frequently desire to change hooks when the weight or type of fish being caught changes substantially during the fishing period. Also, some fishermen find it highly desirable to prebait hooks so that when the line is drawn up, an already baited hook is available.

According to our invention, we have discovered a hook seat which allows easy and quick interchange with an infinite variety of hook sizes and lures particularly designed to fit therein. The hook seat includes a cylindrical barrel closed at both ends. A pair of apertures, usually substantially axially aligned, are disposed in the end closures. In the bottom closure, a transverse slot is formed, extending out to the edge. Extending upwardly on the barrel, another slot is formed communicating with the first and terminating generally about half way up in an enlarged aperture. The diameter of the aperture in the barrel is larger than the width of any slot or the diameter of the lower aperture. The outer edges of the closures extend outwardly from the barrel to form flanges. A closure ring is fitted around the barrel and slidably arranged to move freely between the flange formed by the lower closure and that which is formed by the upper closure. A groove is incorporated inside of the closure ring so that it can fit over the lower flange and be detachably secured thereto. When the ring is fitted over the lower flange, it closes the slot on the side of the barrel.

The interchangeable hook is disposed within the hook seat. To secure the hook, a pair of spaced-apart spheres are disposed on the shank adjacent to the end where the eyelet is normally positioned. Generally, the spheres are secured by axially drilling holes therein of sufficient diameter to allow passage of the shank. They can then be placed upon the shank and soldered in place easily. In a preferred modification, the two axially bored spheres can be separated by a hollow spacer tube joined at the periphery of the bores. The entire assembly can then be readily slipped upon the shank and soldered in place in one operation.

When changing hooks, the shank is tilted 90° and the spacer carried along the barrel slot until the upper sphere can be removed from the aperture in the barrel. The diameter of the aperture in the barrel is greater than the diameter of the sphere so that it can be removed. To insert a new hook, the process is reversed and when seated in the lower aperture, the slide ring can be drawn over the lower flange and secured.

Accordingly, the primary object of our invention is the easy interchange of fishing hooks and lures.

The many other objects, features and advantages of the instant invention will become manifest from the following description when taken in conjunction with the accompanying drawing wherein specific embodiments of our invention are shown and described by way of illustration examples.

Of the drawings:

FIG. 1 is a perspective view of the interchangeable fish hook and hook seat.

FIGS. 2 and 3 are cross-sectional views of the fish hook and hook seat, illustrating, in particular, the positioning of the fish hook and how it is inserted in place.

FIGS. 4 and 5 are embodiments of fishing lures which can be placed upon the interchangeable hooks.

FIGURE 6 is a cross-sectional view, taken along the lines 6—6 of FIGURE 4, illustrating the retaining means which is used to hold the hook in the hook seat.

Referring now to FIG. 1, the detachable hook 1 includes the shank 3 with a barbed hook 5 disposed at one end. Disposed upon the other end of the shank 3 is the retainer assembly 7 which includes a pair of axially-bored, spaced-apart spheres 9 and 11.

The hook-seat 15 includes a cylindrical barrel 17, closed at both ends with closure members 19 and 20. Each of the closure members 19 and 20 have a diameter larger than the diameter of the barrel 17 so as to form peripheral flanges extending outwardly therefrom. A slot 21 extends transversely across a lower closure with an aperture generally formed substantially in the center. A second slot 23 is extended upwardly along the barrel 17 in communication, at the lower end, with the closure slot 21 and at the upper end, with a barrel aperture 25. The diameter of the aperture in the closure is less than the diameter of the upper sphere 9 so that the fish hook cannot pull out, but is free to swing and rotate. The diameter of the barrel aperture 25 is larger than the upper sphere 9 so that it may pass through when removal of a hook is desired.

Freely slidable along the length of the barrel 17 is a ring 27 adapted to fit detachably on the flange formed by lower closure 20, to retain a hook in the slot 25 but prevent it from moving into slot 23. When slid along the barrel 17, the ring 27 will abut against the flange formed by the closure member 19. The ring is preferably knurled, generally with a diamond-shape cut, so that it can be easily moved even with wet hands. Furthermore, the use of knurling can prove beneficial in fishing since it casts reflection in the water.

When slid to the opposite end of barrel 17, the knurled ring 27 can be forcibly placed around the peripheral flange of closure member 20. A groove 31 formed around the inside of ring 27 fits over the flange of closure member 20 to secure it through compression. The second slot 23 provides sufficient yielding space to allow the ring 27 to slide over the flange.

Disposed in an aperture (not shown) in the upper closure 19 is an eyelet 29, freely rotatable and securely seated. Subdisposition can prevent twisting and snarling of the line as the hook moves. If desired, a spinner or other suitable fish attracting devices can be disposed upon the shank of the eyelet 29.

Referring now to FIGS. 2 and 3, a hook is inserted or removed by placing or removing the upper sphere 9 into the barrel aperture 25 and then tilting the shank 90° so that the space between sphere 9 and sphere 11 is carried along the barrel slot 23 and into closure slot 21 in the lower barrel closure 20. The ring 27 is slid along the barrel 17 so that a groove 31 in the lead edge snaps over the flange of closure member 20.

In FIG. 3, the hook 1 is seated in the closure aperture and held by upper sphere 9. Lower sphere 11 is particularly vital to prevent the shank 3 from sinking into the barrel 17 and fouling the hook. The hook, however, is free to pivot about the sphere and move approximately 130° within the closure slot 21. While we have shown and described a sphere, other shapes such as an inverted tear-drop can be used also and are included within out definition.

In FIGURE 6, the shank 3 is shown united in the retainer which includes upper sphere 9 and a lower sphere 10. Spacing these spheres apart on the shank is hollow tube 10. These elements may be formed of a single machined unit, if desired, or may be individually mounted upon the shank 3.

In other embodiments of the invention shown in FIGS. 4 and 5, a plastic worm 35 or a spoon or other type lure 37, colored as desired or appropriate, can easily be added to the shank 39, instead of a barbed hook. The hooks may be attached to the lure at an appropriate location.

It is apparent that modifications and changes may be made within the spirit and scope of the instant invention but it is our intention, however, only to be limited by the appended claims.

As our invention we claim:

1. Fishing tackle comprising: means forming a hook seat; shank means disposed in said hook seat; at least two retaining means disposed upon said shank means; one of said retaining means being disposed within said hook seat and one being disposed outside thereof; means forming a first slot disposed in said hook seat, the width of said slot being at least as great as said shank, but less than either of said retaining means; means forming an aperture at the end of said slot, the width of said aperture being at least as great as the retaining means disposed within said hook seat, whereby said shank can be slipped into and out of said hook seat; a top and a bottom closure disposed at either end of said hook seat, a second slot formed in said bottom closure, said second slot being arranged in communication with said first slot; said bottom closure including a flange which extends outwardly from said hook seat; securing means slidably disposed about said hook seat and first slot for keeping said shank and retaining means therein, said securing means including an internal groove disposed therein, whereby said flange can be received in said groove and compressibly held by said securing means.

2. Fishing tackle comprising: means forming a hook seat; shank means disposed in said hook seat; at least two retaining means disposed upon said shank means; one of said retaining means being disposed within said hook seat and one being disposed outside thereof; means forming a first slot disposed in said hook seat, the width of said slot being at least as great as said shank, but less than either of said retaining means; means forming an aperture at the end of said slot, the width of said aperture being at least as great as the retaining means disposed within said hook seat, whereby said shank can be slipped into and out of said hook seat; means forming a top closure and means forming a bottom closure for said hook seat; a second slot formed in said bottom closure means, said second slot being arranged in communication with said first slot; movable securing means disposed about said hook seat and first slot for keeping said shank and retaining means therein; said securing means including means for detachably holding said securing means to said bottom closure means.

3. The fishing tackle according to claim 1 wherein an aperture larger than said shank but smaller than said retaining means is disposed in the slot in said bottom.

4. The fishing tackle according to claim 1 wherein said retaining means are a pair of spheres each having an axially bored hole disposed therein.

5. The fishing tackle according to claim 4 wherein said spheres are spaced apart and supported by a hollow tube.

6. The fishing tackle according to claim 1 wherein said top of said hook seat has a freely movable eyelet disposed therein.

References Cited
UNITED STATES PATENTS

| | | | |
|---|---|---|---|
| 236,161 | 1/1881 | Hymers | 43—44.86 |
| 1,380,244 | 5/1921 | Otis. | |
| 1,769,245 | 7/1930 | Tregoning | 24—116.1 X |
| 2,305,234 | 12/1942 | Bratz | 24—223 |
| 2,763,089 | 9/1956 | McDonald | 43—44.83 |
| 2,772,902 | 12/1956 | Lind. | |

SAMUEL KOREN, *Primary Examiner.*

D. J. LEACH, *Assistant Examiner.*